Feb. 10, 1931.  R. L. ATKINSON  1,792,058
METHOD OF MAKING COLORED GRANULES AND THE ARTICLE MADE THEREBY
Filed Jan. 13, 1930  2 Sheets-Sheet 1
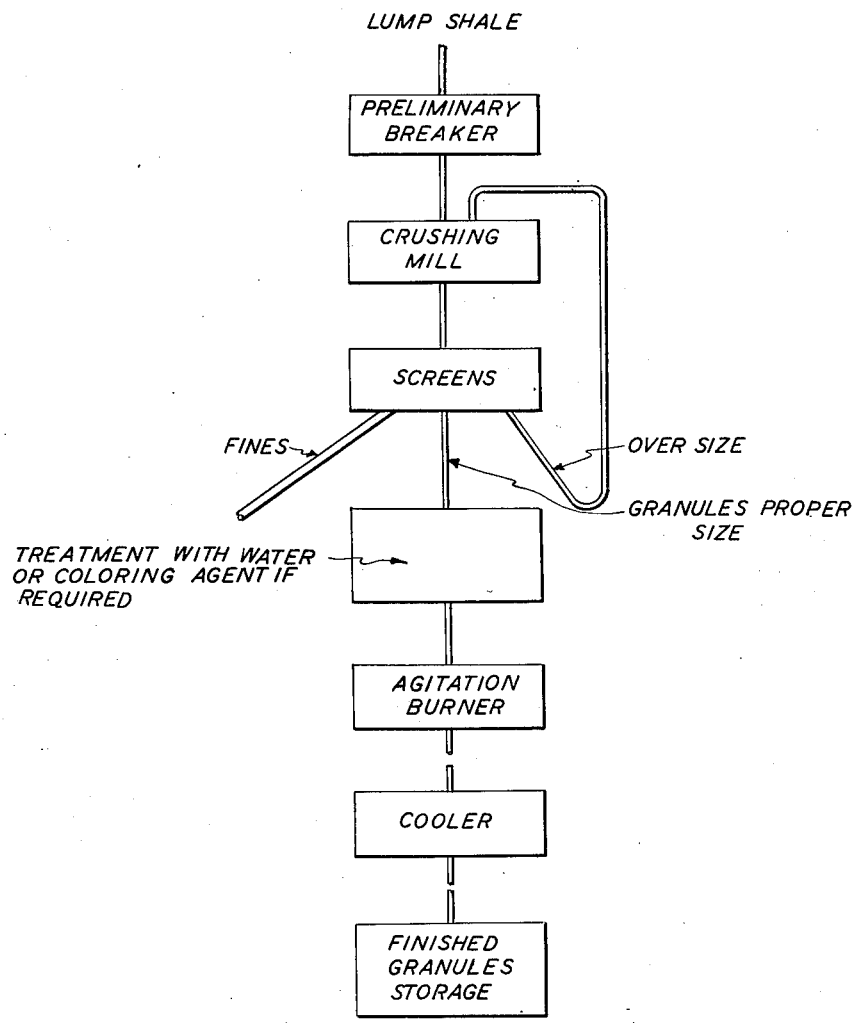

Feb. 10, 1931.   R. L. ATKINSON   1,792,058
METHOD OF MAKING COLORED GRANULES AND THE ARTICLE MADE THEREBY
Filed Jan. 13, 1930   2 Sheets-Sheet 2
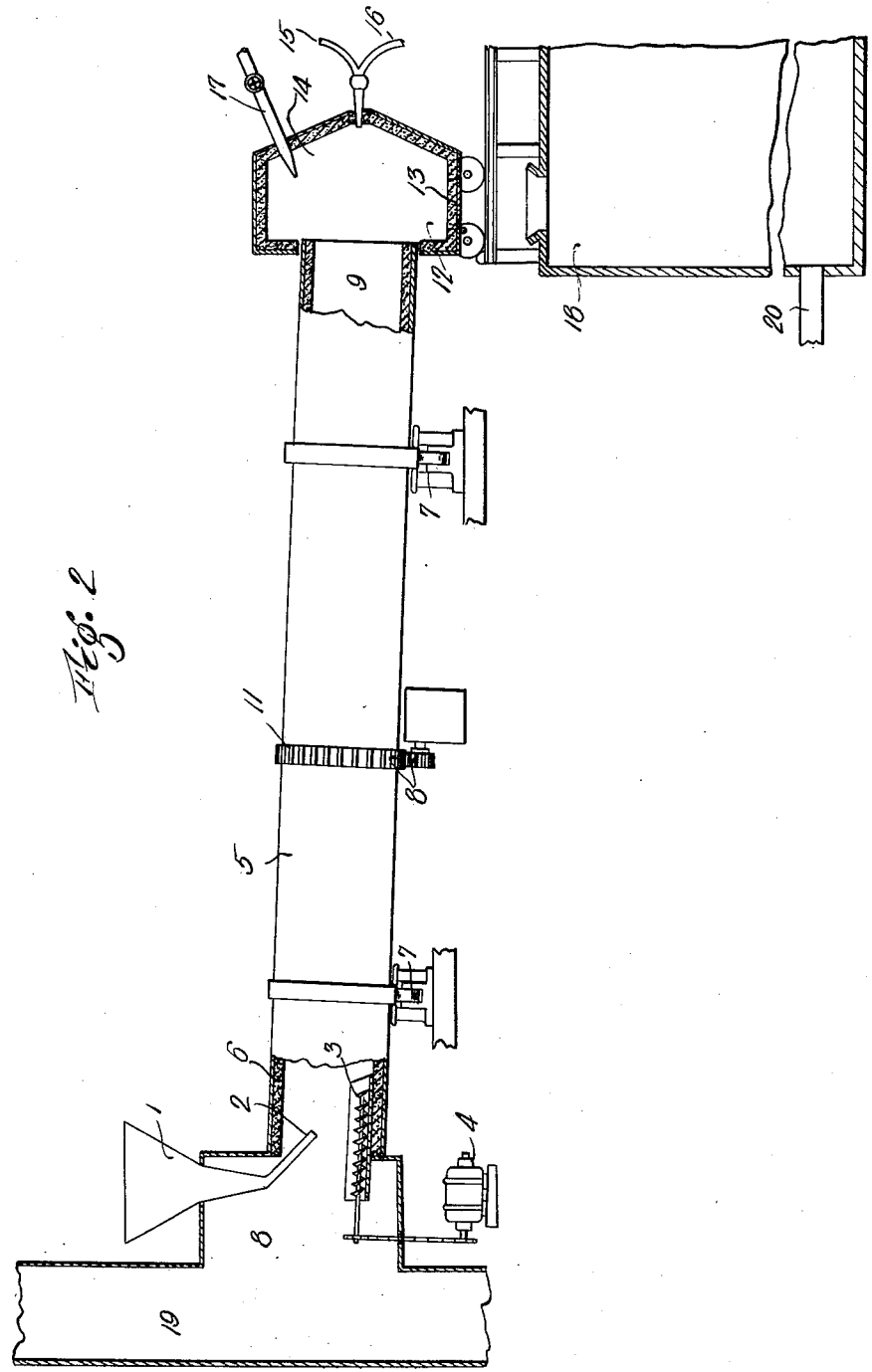

Patented Feb. 10, 1931

1,792,058

UNITED STATES PATENT OFFICE

RALPH L. ATKINSON, OF DORCHESTER, MASSACHUSETTS, ASSIGNOR TO ARTHUR D. LITTLE, INCORPORATED, OF CAMBRIDGE, MASSACHUSETTS, A CORPORATION OF MASSACHUSETTS

METHOD OF MAKING COLORED GRANULES AND THE ARTICLE MADE THEREBY

Application filed January 13, 1930. Serial No. 420,604.

This invention relates to colored granular materials which are suitable for use in architectural finishing and for decorative purposes, such as roofing shingles, and to a method of preparing the same.

In constructions having cement or similar surfaces as well as manufactured articles, such as cement or asphalt roofing and other plain colored substances which are to be used more or less for decorative purposes, it is frequently desirable to combine therewith a weather-resistant colored granular material such as crushed slate.

The naturally occuring colored slates which are suitable for such purposes are limited with respect to distribution and also with respect to the range of colors which they present. On the other hand, the demand for granules for the purposes indicated requires brighter hues and a greater variety of colors than are to be found in the slates or other common minerals which are available.

It has been proposed and practiced to some extent to bake argillaceous materials, such as clay, made in the form of bricks or other shapes and to then crush the baked material and separate out the granules of the desired sizes as by screening. Such procedure, however, produces a large proportion of fine sizes of granules and dust which is of no further use and a large amount of coarse sizes which must be again crushed and sized, with concomitant elimination and waste of fines. Not only is power required in such operations for crushing the raw material from which the bricks are made but also for crushing the baked material to granular form. In large operations the disposal of the waste fines presents a serious problem and represents a great loss of material, labor, power and fuel.

Moreover, the procedures heretofore followed may produce a non-uniformly burned material which is over-burned on the outside or under-burned at the center and which is of varying color and texture from the exterior to the interior, so that when it is crushed the resulting granules present corresponding variations of color, hardness and other properties such as density, weather resistance, adsorption, etc.

A further objection to such procedures is that the crushing of already baked materials not only produces a large proportion of fines, amounting to one-half or more of the material treated, but leaves the granules of the required size in a weakened condition so that subsequent handling still further reduces the sizes of the grains with increase of undesirable fines and dust. Consequently, the product is non-uniform.

An object of the present invention is to provide a granular material of uniform properties and coloration, and a method of producing the same whereby raw materials (which are available in large quantities) may be efficiently and completely utilized and the color and other properties of the product may be controlled. Other objects will appear from the following disclosure.

The procedure of the invention generally includes the reduction of a suitably compact argillaceous material (which is susceptible to hardening by heat) to comminuted granules of the required sizes (e. g. 8 to 35 mesh) by crushing and grading, roasting the selected size or sizes of material at relatively uniform, predetermined temperature and in contact with a regulated atmosphere, for a definite period of time, followed by cooling and blowing any dust from the finished product, if desired or necessary.

The raw material used may be a firmly consolidated, massive clay (such as that known as "lower Kittaning deposit", vein No. 3, Pennsylvanian) or a more dense compact argillaceous shale (such as red brick shale, Watsontown valley, Pennsylvania) and may either contain refractory colored oxides such as iron oxide or be relatively light or even white in color. Materials of these characteristics may be crushed, and fracture, without crumbling, into sharp irregular granules which may be screened and separated into the desired sizes substantially without further comminution thereby. Whatever finer sizes and dust are obtained from the screening operation are (on account of their unburned condition) adapted for mixing with water to form plastic moldable compositions suitable for use in making molded refractories or other ceramic products and constitute a valuable by-product.

The sized granules are characterized by having a relatively narrow range of dimensions and consequently, upon being subjected to roasting, are quickly and thoroughly heated to the temperature required. Accordingly, upon roasting, they acquire a uniformly hardened surface and structure and if such treatment is properly regulated and distributed throughout the charge, the product will have dependable and readily reproduced properties, such as hardness, texture, adsorption, resistance to weathering, etc.

Moreover, it is found that with raw materials containing colored oxides or mineral compounds which are subject to decomposition into refractory coloring agents, the color of the finished product may be determined by the time and temperature of the roasting operation and also by the oxidizing or reducing character of the kiln gases or atmosphere. Thus, with a strongly oxidizing atmosphere, by providing free access of air to the kiln or to the cooling zone (or both) a raw material containing iron oxide will acquire a bright red color, whereas in a reducing atmosphere, such as carbon monoxide,—produced by a restricted supply of oxygen to the combustion gases, a dark red or black product may be obtained. By selecting and maintaining a given temperature and time of treatment, and a kiln atmosphere of relatively constant composition, various desired intermediate shades may be obtained in the ultimate granular product and may be consistently and uniformly reproduced. Such colors may be produced essentially uniformly throughout the cross section of each individual granule as well as throughout the charge as a whole, so that subsequent handlings and later exposure will not be accompanied by variations or loss in color nor produce other changes in the characteristics of the granular product.

A specific example of carrying out the invention with the shale or clay, as above mentioned, will be described with reference to the accompanying drawings, in which:

Fig. 1 is a flow sheet showing the sequence of operations; and

Fig. 2 is a side elevation, partly in cross section, of an inclined rotary kiln.

In practice, the hard, dense clay or shale, in the form of large irregular lumps as it comes from the usual mining operations, is put through one or more crushers, such as a jaw crusher followed by a series of the ordinary roll crushers, for example, in which the successive rolls may be set increasingly close together. The final set of rolls will be set to the size or sizes of granules desired, i. e., at a distance equal to or somewhat greater than the dimensions of the coarsest size. The entire run of mill may be sent through all of the crushers and subsequently graded by screening and the coarser lumps returned for re-crushing. But ordinarily it will be more efficient and produce a better product to remove the ultimately desired sizes of grains and dust from the crushed product as it comes from each set of rolls, while the coarser sizes are passed to the next set of rolls and still further reduced.

The crushed material, as thus graded to produce granules of the specific size or range of sizes required, is then charged into the hopper 1 (see Fig. 2) and gradually fed through the (controllable) opening 2 into a trough 3 and thence by means of a worm (driven by suitable connection to motor 4) into the upper end of the inclined rotary kiln chamber 5. The latter is provided with a refractory lining 6 and is mounted for rotation about its longitudinal axis upon trunnions 7. The kiln is inclined downwardly from the entrance end 8 to the exit end 9, so that as the kiln is rotated (by the gears 11) the granules are tumbled over and over and at the same time slide and roll downwardly to the exit end 9 where they fall into a receiver space 12 from which they may be removed through a trap 13. The kiln may be appropriately constructed and heated from its exterior surface, if desired, but the operation is more efficiently carried out by means of a direct flame (such as oil, gas or other suitable fuel) which may be introduced into the kiln through a removable refractory hood, as shown at 14, for example, together with a regulated supply of fuel and air, as at 15 and 16, respectively. The hot gases of combustion (and flames, if desired) may pass upwardly over and through the descending stream of granules.

Intimate contact and uniform heating by the flames or combustion gases is afforded by the scattering and rolling movement of the granules, so that each is uniformly heated on all sides and all of the granules are subjected to like atmospheric and temperature conditions. Accordingly the oxidizing (or reducing) effects of the hot gases upon the coloring agent and consequently the ultimate color of the granules will be essentially uniform. Moreover, the counter current effect brings the granules, as first introduced into the kiln, into contact with the gases after their temperature has been somewhat reduced. The temperature of the granules is accordingly raised during their passage through the length of the kiln. The working temperature of the kiln may be attained before feeding in the granules and then maintained relatively constant (as well as the composition of the kiln atmosphere) by using a constant supply of fuel and a constant air supply for combustion. The effective composition and temperature of the gases coming into contact with the granules may be further regulated by adjusting the position of the hood 14 forward or back. Additional air may be passed through the material either while in the cooling chamber 12 or through a separate controllable opening (17) in the kiln chamber. The optimum temperature for any given material will be determined by experiment, and also the time of treatment which may be adjusted by the angle of inclination of the kiln and the speed of rotation, as well as the rate at which the raw material is fed into the kiln chamber. Ordinarily, however, the temperatures may be lower and/or the time of treatment shorter than as heretofore employed in burning or baking shapes and, in the present method, will be sufficient to harden the granules without causing fusion. With granules of the raw material above described, for example, the combustion gases at a temperature of 1750° F. to 2000° F., and in a kiln rotated at a proper speed, burn the granules in approximately 3 to 5 hours to a uniform degree throughout their cross section, and their hardness is developed to a maximum. Moreover, the entire body of each granule is evenly permeated by the hot gases as well as by the heat, but the surfaces are not over heated and consequently are not fused nor made more dense than the interior.

As the granules reach the exit end of the kiln 9 they fall into a receiver 12 and may be removed therefrom, as for example through the trap 13 into cooling tank 18. This serves to prevent the entrance of any appreciable amount of air and provides for slow cooling. But if a bright red color is desired and iron oxide is present, a draught of air through the slowly cooling granules is effective to produce this result. This may be introduced either through trapdoor 13 or the pipe 20 leading into the cooling tank 18.

The spent gases of combustion pass through the upper end of the kiln into a stack 19.

The granules thus obtained are of uniform properties and, by providing and maintaining like conditions in the kiln, may be reproduced in any desired quantity from a given raw material without difficulty. Each granule, though hardened by the heat treatment, possesses a surface substantially of the same texture and roughness as the raw material, which facilitates incorporating it into a fluid matrix, such as asphalt, as well as its subsequent retention thereby. This effect may be still further improved by moistening the raw material before roasting. While this produces a notably clearer and brighter color, the difference thus effected in the texture of the surface is not obvious to the naked eye. Nevertheless, it manifests itself under the microscope and by the improved facility with which the grains, roasted in moist condition, may be subsequently embedded and retained in fluid matrices such as asphalt and the tenacity with which they are held thereby.

The roasted granules may be cooled somewhat in the receiver 12 (or more completely in cooling tank 18) and when removed are ready for use. If it is necessary that they be entirely free from dust they may be blown with a blast of air, but ordinarily they are especially free from extraneous matter, and it is preferable to use them without further treatment. They may be applied to cement or other suitable materials, such as asphalt and the like, and forced into the surface portions, according to the usual practices.

If colors other than the natural colors of the raw materials or colors imparted by the roasting operation are desired, suitable coloring agents such as minerals or compounds which are decomposable into resistant colored oxides, such as iron oxide (for bright red to dark red), manganese oxide (for brown), copper oxide (for green), cobalt oxide (for blue), chrominum oxide (for green), and the like, may be applied to the granular material before the heat treatment. These compounds may also produce colored products by reaction with the clay or shale, such as silicates.

This treatment is conveniently accomplished by treating the granules before roasting (as by spraying, evacuating and soaking, dipping, impregnating under pressure, etc.) with a water solution of a corresponding salt or salts (decomposable into a coloring agent) and then drying. Or, if the granules are to be introduced to the heat treatment in moist condition, they may be fed to the kiln while in slightly moist condition. When such coloring agents are added to the granules, the temperatures and time required to produce the requisite color or shade may be varied accordingly and may, for example, be considerably lower than those above mentioned. It may also be desirable, in some instances, to convert the impregnant salt into a hydroxide,—as for example, by treating granules saturated with ferrous sulphate solution with caustic soda solution or ammonia to form the hydroxide which is more readily decomposed by heat than the sulfate,—the reaction products being soluble and leached out by water.

I claim:

1. Method of making colored granules comprising the steps of reducing compacted raw clay or shale to grains of the ultimately required size or sizes, separating the same from finer sizes and dust, and heating to a hardening temperature, without fusion.

2. Method of making colored granules comprising the steps of reducing compacted raw clay or shale to grains of the ultimately required size or sizes, separating the same from finer sizes and dust, and heating to a hardening temperature, while agitating the granules.

3. Method of making colored granules comprising the steps of reducing compacted raw clay or shale to grains of the ultimately required size or sizes, containing mineral coloring agents, separating the same from finer sizes and dust, and heating to a hardening temperature, while maintaining the granules in a loosely scattered condition and in intimate contact with a predetermined atmosphere.

4. Method of making colored granules comprising the steps of reducing compacted raw clay or shale to grains of the ultimately required size or sizes, containing mineral coloring agents, separating the same from finer sizes and dust, and heating to a hardening temperature, in uniform contact with a gas reactive to control the color of said granules.

5. Method of making colored granules comprising the steps of reducing compacted raw clay or shale to grains of the ultimately required size or sizes, containing mineral coloring agents, separating the same from finer sizes and dust, and heating to a hardening temperature, in uniform contact with a gas reactive to control the color of said granules and maintaining the composition of said gas substantially constant.

6. Method of making colored granules, comprising the steps of reducing compacted raw clay or shale to grains of the ultimately desired size or sizes, containing mineral coloring agents, separating the same from finer sizes and dust, feeding the granules into contact with hot gases, and regulating the temperature and composition of said gases to determine the color of said granules.

7. Method of making ceramic materials, comprising the steps of crushing raw clay or shale to granular condition, separating granules of the desired size or sizes therefrom, mixing the smaller sizes of granules and dust with water to produce a plastic ceramic composition and firing the same.

8. Method of making clay or shale granules for architectural finishing purposes, which comprises comminuting compacted raw clay or shale to a granular mass containing grains of the ultimately required size, separating said grains of the ultimately required size from other sizes and from dust, and subjecting the same to a non-fusing, hardening temperature.

9. Granular material, the individual granules being characterized by having a heat hardened, non-vitrified body of argillaceous shale and angular shapes corresponding substantially to the fracture of the original shale.

10. Granular material, the individual granules being characterized by having a heat hardened, non-vitrified body of compact clay and angular shapes corresponding substantially to the fracture of the original clay.

11. Granular material, the individual granules being characterized by having a heat hardened, non-vitrified body of compact argillaceous material and of angular shape corresponding substantially to the fracture of the original raw material.

12. Method of making colored granules comprising the steps of reducing compacted clay or shale to grains of the ultimately required size or sizes, separating the same according to said sizes, treating the separated material with coloring agents and subjecting to a hardening temperature and to a predetermined atmosphere to develop and control the color of the granules.

Signed by me at Boston, Massachusetts, this 11th day of January, 1930.

RALPH L. ATKINSON.